Figure 1:
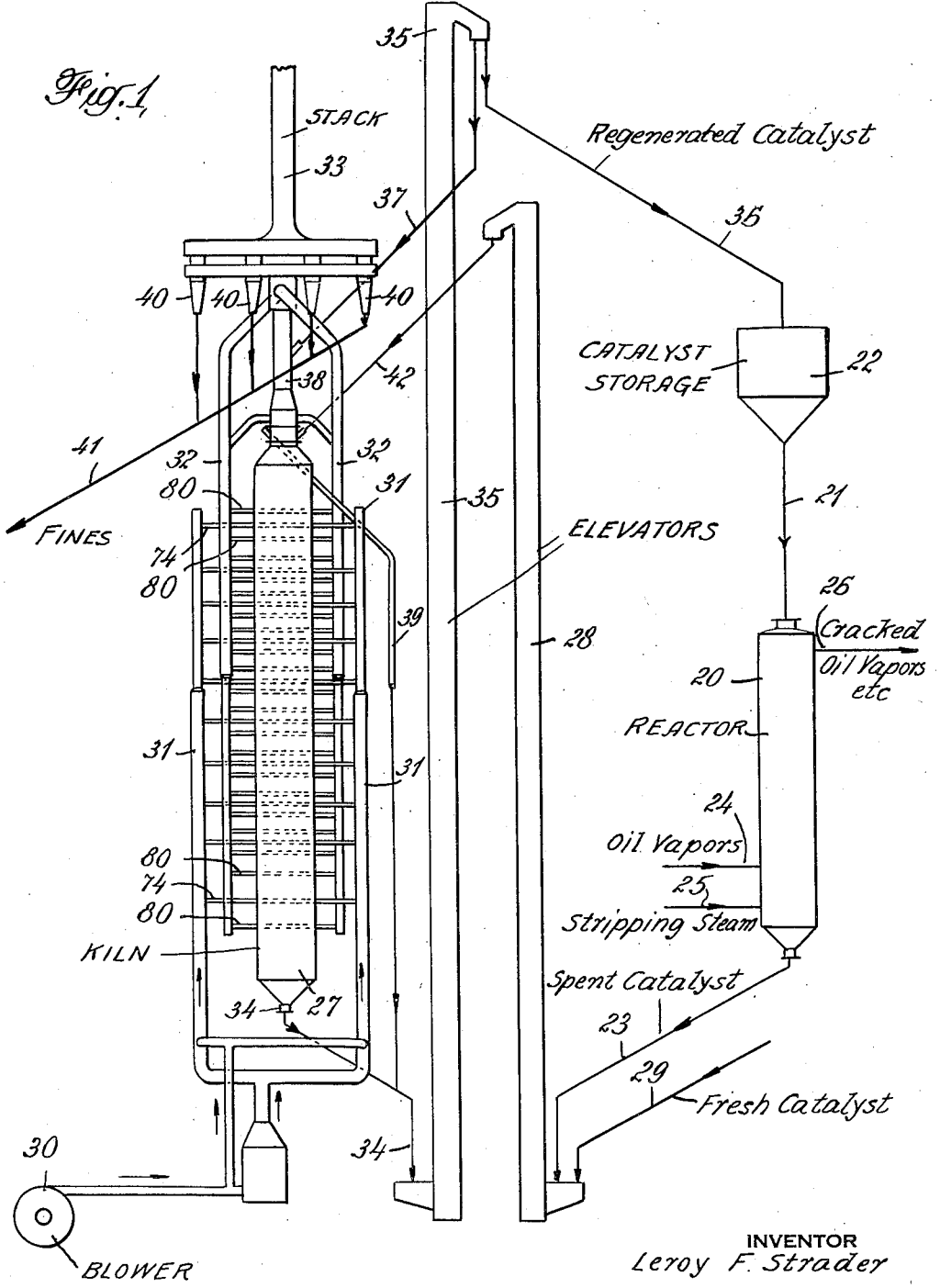

Jan. 10, 1950 L. F. STRADER 2,493,784
CATALYST REGENERATION APPARATUS
Filed June 20, 1945 5 Sheets-Sheet 3

INVENTOR
Leroy F. Strader
BY
ATTORNEYS

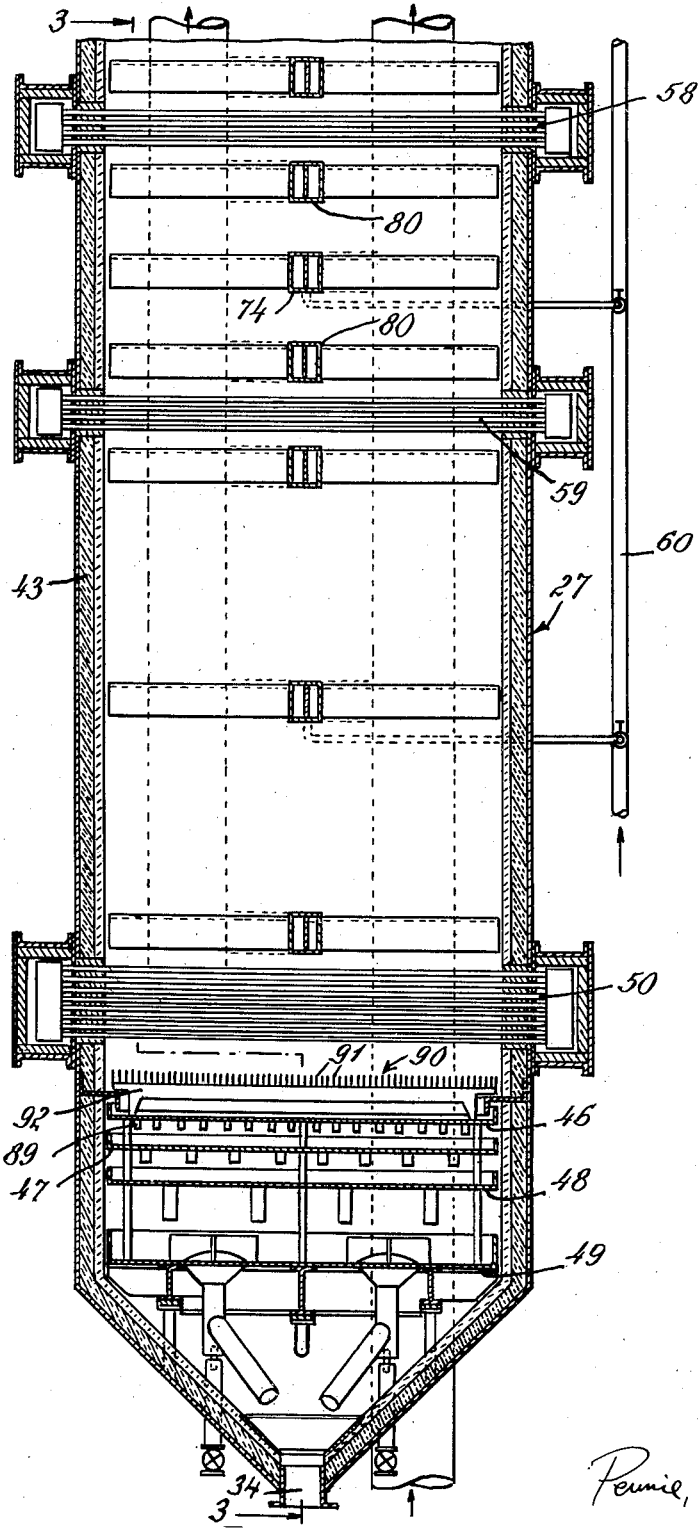

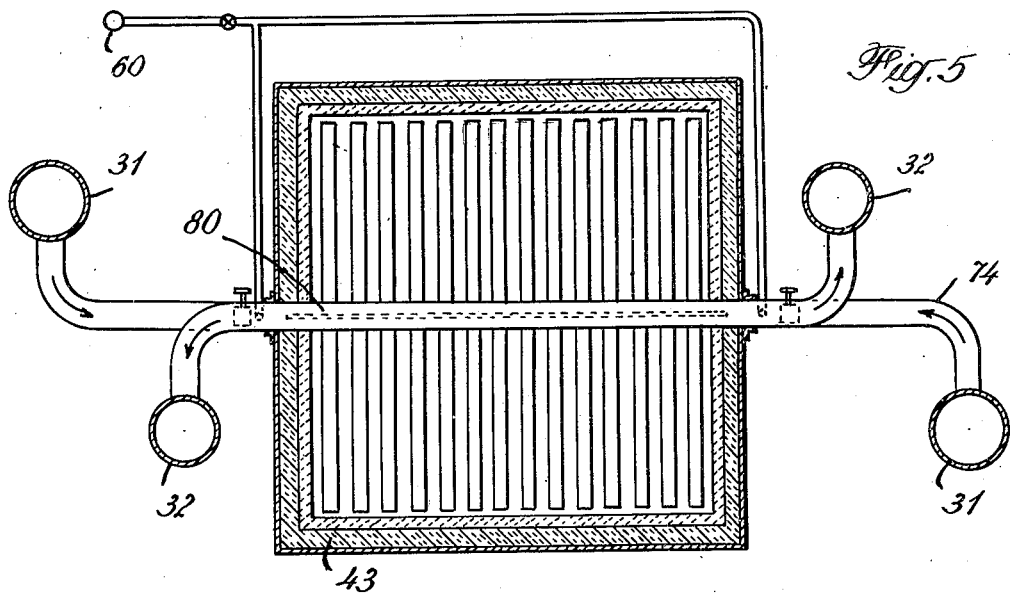
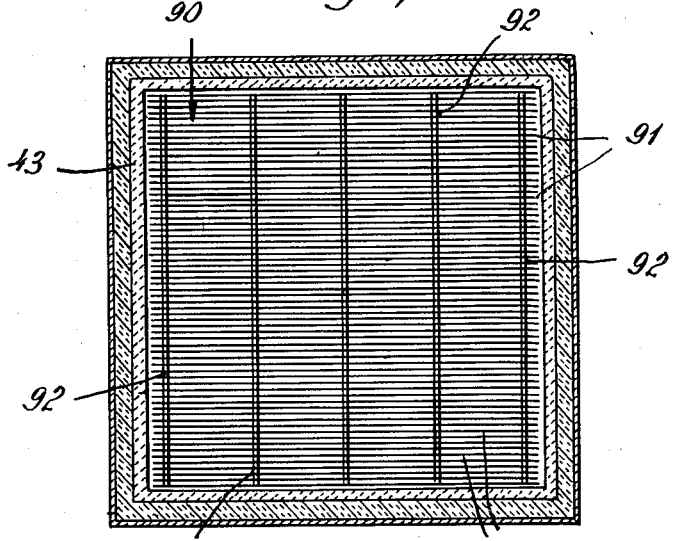
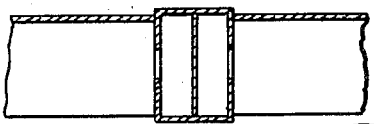

Patented Jan. 10, 1950

2,493,784

UNITED STATES PATENT OFFICE 2,493,784

CATALYST REGENERATION APPARATUS

Leroy F. Strader, Long Beach, Calif., assignor, by mesne assignments, to Houdry Process Corporation, Wilmington, Del., a corporation of Delaware Application June 20, 1945, Serial No. 600,474

1 Claim. (Cl. 23—288)

My invention relates to improvements in kilns for regenerating spent pelleted catalysts used to promote the cracking of hydrocarbons. The regeneration involves burning off of the coke deposited on the catalyst as an incident of the cracking reaction. My invention relates particularly to vertical shaft kilns, to the upper end of which spent catalyst is charged, from the lower end of which regenerated catalyst is discharged and in which a charge of catalyst moving downwardly through the kiln is blown with air to burn off the coke. In such kilns it is important that the movement of catalyst downwardly through the kiln be substantially uniform across the entire shaft throughout the combustion zone. Otherwise irregularities in burning occur, the efficiency and capacity of the kiln are reduced, and frequently irregularities in movement become abrupt or periodic or both imposing severe stresses on the kiln structure and adding to the degradation of catalyst resulting from irregular burning. My present invention promotes uniform movement of the charge downwardly through the shaft of such kilns.

To distribute the downward flow of catalyst across the shaft, it is customary to arrange one or more horizontal baffles across the lower end of the shaft of the kiln, below the combustion zone and spaced above the lower end of the kiln, provided with a plurality of ports through which the catalyst moves in a plurality of divided streams whereby a satisfactory flow pattern is established. Any restriction of one, or of a limited number, of such ports of course localizes the flow and thus produces precisely the reverse of the intended effect. In a real kiln, however, particularly over the long periods of uninterrupted operation essential to economy, an occasional piece of broken refractory or an agglomerate formed in the burning, for example, will find its way into some of these ports, lodge there, and effect such local restrictions. Positioned at the level of the ports, the ordinary screen serves merely to retain pieces which might otherwise pass through the ports at a restrictive point. Positioned above the level of the ports, the ordinary screen merely establishes a new level at which obstructions interfere with uniformity of flow. Basket screens over individual ports create as many irregularities as they cure.

I have devised a screen which, when properly related to the baffle and the ports therethrough in such a kiln, effectively prevents the passage of the bulk of any pieces which might lodge in or obstruct the ports and which also seems to reestablish a flow between the screen and the baffle such that the ports continue to function to maintain a satisfactory flow pattern even though an occasional obstruction is formed above the screen by pieces retained on the screen.

In my improved kiln, I arrange a horizontal baffle across the shaft of the kiln, below the combustion zone and spaced above the lower end of the kiln, this baffle being provided with a plurality of distributing discharge ports, in accordance with customary practice, and I arrange a horizontal grid across the shaft of the kiln, above the baffle and below the combustion zone. This grid I construct of a plurality of deep and narrow spaced bars extending entirely across the shaft. The depth of the bars contributes to their strength and rigidity, but it also establishes defined passages between each pair of adjacent bars which contribute to the function of reestablishing proper flow between the grid and the baffle above noted. By making the bars narrow, a minimum of interference is offered to the flow of catalyst. The bars are narrow in the absolute sense; for example the aggregate width of the bars collectively is substantially less than, not more than one fourth of, the internal dimension of the kiln on the same axis. The distance between the bars, that is their spacing, is not greater than the diameter of the discharge ports. The distance between the grid and the baffle is not less than three times the distance between the bars; the relationship being involved in the reestablishment of proper flow between the grid and the baffle. The distance between the grid and the baffle is not less than twice the diameter of the discharge ports in the baffle; this relationship also being involved in the reestablishment of proper flow between the grid and the baffle. The baffle just referred to may be one, usually the uppermost, of a series of such baffles.

Figure 2:
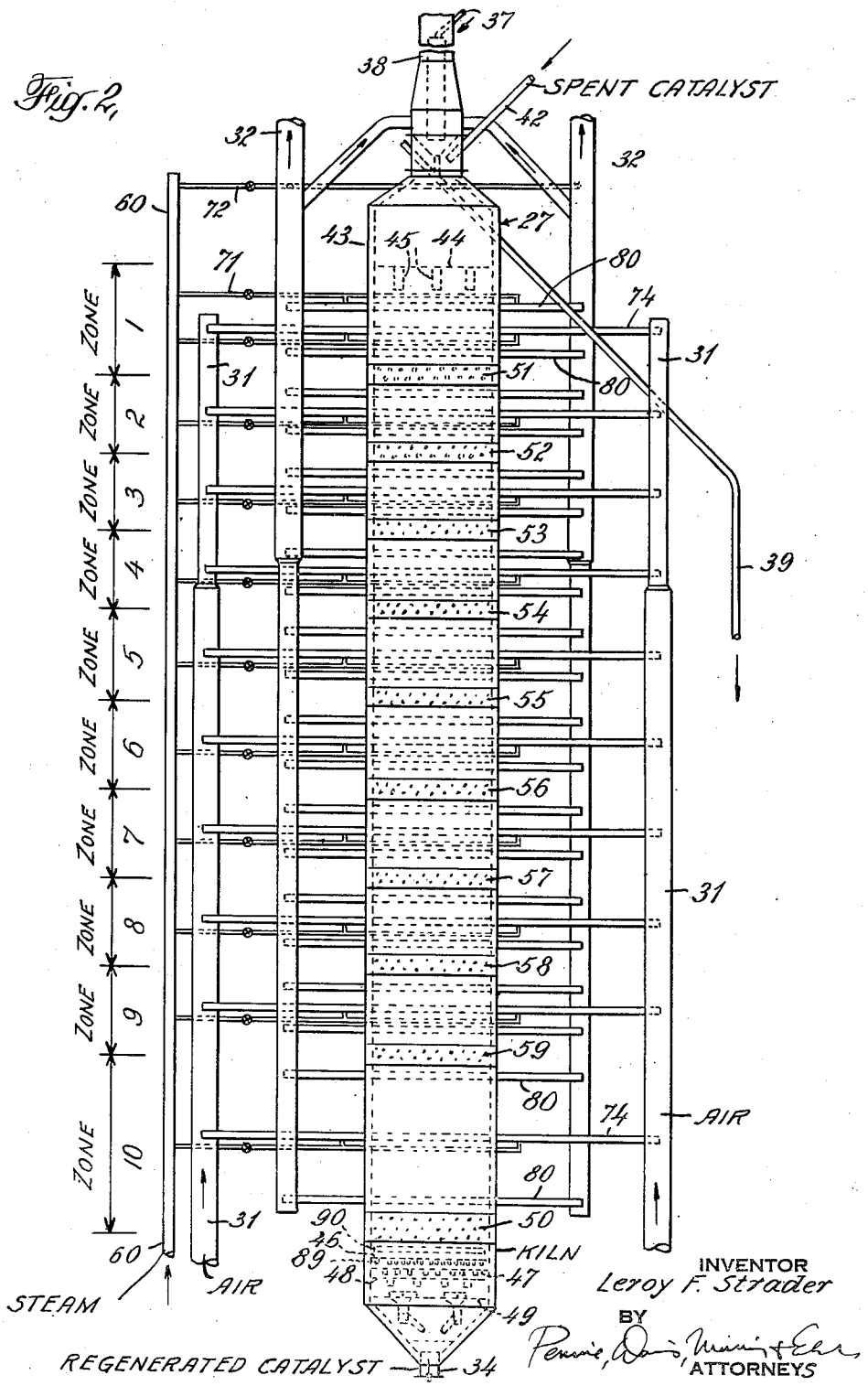
Figure 3:
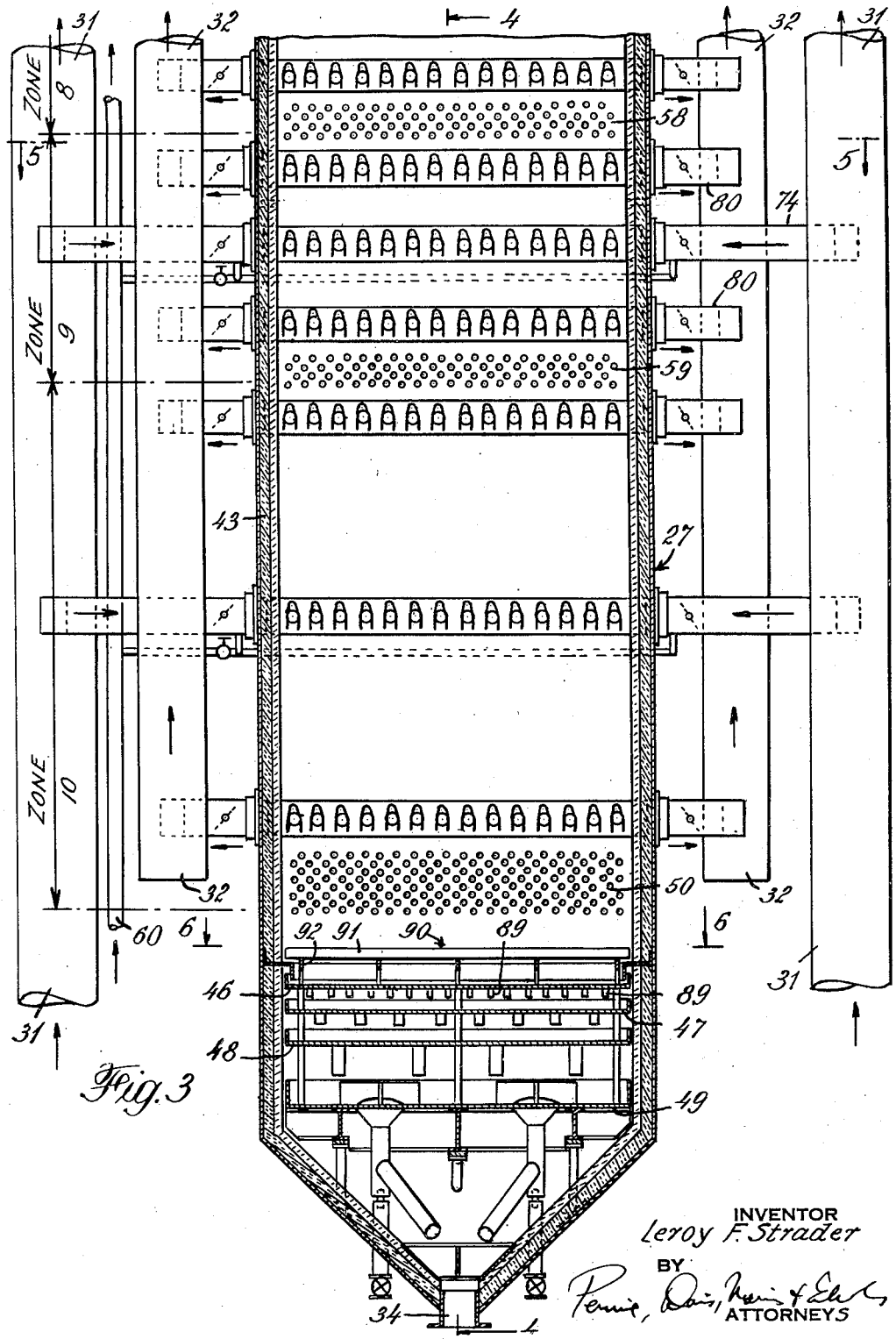

The accompanying drawings illustrate apparatus embodying my invention. Although diagrammatic and conventional, these drawings are in general of scale proportions although in some instances, notably in Fig. 2, parts have been spaced to promote clarity of illustration. Referring to these drawings:

Figure 1 is a flow diagram of a cracking system embodying a kiln, at the left of the drawing, of the type to which my invention relates, Figure 2 is an elevation of a kiln, such as that illustrated in Figure 1, Figure 3 is an enlarged section of the lower part of the kiln illustrated in Figure 2, on line 3—3 of Figure 4, Figure 4 is an enlarged section of the lower part of the kiln taken at right angles to the section constituting Figure 3, on line 4—4 of Figure 3, Figure 5 is a section on line 5—5 of Figure 3, Figure 6 is a section on line 6—6 of Figure 3, illustrating the grid, and Figure 7 is a fragmentary section of any of the beam ducts associated with distributing or collecting troughs in the several sections illustrated in Figures 3 and 4.

Referring to Figure 1 as a diagram of the cracking operation as a whole: A charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 lbs. per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of bodies in a corresponding series of zones through which air is blown by means of blower 30 and distributing ducts or manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the catalyst storage chamber 22 by means of bucket elevator 35. Part of the regenerated catalyst passes from the head of elevator 35 directly to chamber 22 through connection 36. Another part, 5%–10% of the total for example, passes, through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35. Or, the coarser material may be returned, through an appropriate seal, directly to the top of the kiln. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Referring to Figure 2 as an illustration of a kiln embodying my invention: The kiln comprises a rectangular thermally insulated and refractory lined shell 43. To promote uniform distribution of the catalyst over a horizontal section of the kiln, a distributor plate 44 carrying nine distributing tubes 45 is arranged at the upper end of the kiln, and to promote uniform flow of the catalyst downwardly through the kiln a series of baffles or collector plates 46, 47, 48 and 49 each carrying appropriately arranged distributing ports or tubes is provided in the lower part of the kiln, the ports or tubes in the plate 46 being marked 89. The construction and operation of catalyst withdrawal devices such as collector plates 46, 47, 48 and 49, are known to the art; see, for example, U. S. Patent 2,412,136 issued on December 3, 1946, to L. P. Evans et al., particularly the disclosure concerning Figures 10 to 12, inclusive, of the patent. In operation, spent catalyst is charged into the upper end of the kiln through connection 42 and regenerated catalyst is discharged from the lower end of the kiln through connection 34, the kiln being maintained substantially full of catalyst between the lower ends of the distributing tubes 45 and the distributor plate 46. This charge of catalyst is divided into ten bodies by nine groups of tubes 51, 52, 53, 54, 55, 56, 57, 58 and 59 through which a cooling medium is circulated, each of these bodies being within a zone independent of the others for control purposes. Another and a somewhat larger group of cooling tubes 50 is arranged beneath the tenth body. For the convenience of reference these several zones are numbered in Figure 2 (and in Figure 3), the zone through which the catalyst first passes being numbered 1 and the zone through which the catalyst last passes being numbered 10. A grid of distributing troughs for introduction of air is arranged centrally of each zone and is connected to the air manifolds 31 through beam ducts 74. A pair of grids of collecting troughs is arranged above and below these distributing troughs in each zone and is appropriately connected to stack manifolds 32 through beam ducts 80. Valved connections are provided for introducing steam, from manifold 60, into the grid of distributing troughs in each of the ten zones as may be required. Valved connections 71 and 72 are also provided for introduction of steam, from manifold 60, into the uppermost grid of collecting troughs in zone 1 into the stack manifolds 32 as a cooling agent, or, in an emergency as a smothering agent. The several connections between the manifold 60 and the several zones may also be used in an emergency to introduce steam as a smothering agent.

Referring to Figures 3 and 4 as more detailed illustrations of that portion of the kiln in which my invention is embodied: The combustion zone in the kiln comprises the several zones numbered 1 to 10 in Figure 2. The baffle 46 carrying ports 89 is the uppermost of a series of collector plates in the lower end of the kiln, all below the combustion zone in the kiln. In my improved kiln, a horizontal grid 90 is arranged above the baffle 46 and below the combustion zone in the kiln. This grid is constructed of a plurality of deep and narrow spaced bars 91 (see also Figure 6) extending entirely across the shaft. The aggregate width of the bars should not exceed one-fourth of the internal dimension of the kiln on the same axis. The distance between each of the adjacent pairs of bars 91 is the same or somewhat less than the diameter of the discharge ports 89 in baffle 46. The distance between the grid, made up of the bars 91, and the baffle 46 is not less than three times the distance between each of the pairs of adjacent bars 91 and not less than twice the diameter of the ports 89 in baffle 46. The several bars 91 making up the grid 90 may be supported in position by welding to a series of transverse spacer and support bars 92 in turn supported from plate 46 by legs at appropriate intervals. For example, each of the five spacer and support bars 92 illustrated in Figure 6 may be supported by five equally spaced legs extending to the plate below. The grid 90 is with advantage so positioned in the kiln that the bars 91 making up the grid run at right angles to the tubes of the group 50 extending across the lower side of zone 10.

The following specific example will illustrate in detail an embodiment of my invention. The kiln was constructed as illustrated in the drawings and the shaft of the kiln was 12 feet 6 inches square. The uppermost of the baffles in the lower end of the kiln carried 256 ports in the form of discharge tubes about 2 inches in inside diameter and 1 inch long. The grid was made up of 104 bars one inch deep, $\frac{3}{16}$ inch in width and 12 feet 4 inches long supported by spacer and support bars in the form of 3 inches by 2 inches by $\frac{3}{8}$ inch angles in turn supported by legs of 3 inches by 2 inches by $\frac{3}{8}$ inch angles. The 1 inch by $\frac{3}{16}$ inch bars were spaced on $1\frac{3}{16}$ inch centers. The lower side of the grid was spaced $7\frac{1}{2}$ inches by 8 inches above the upper surface of the baffle.

I claim:

In a regenerating kiln comprising a vertical shaft, means for charging spent catalyst to the upper end of the shaft, means for discharging regenerated catalyst from the lower end of the shaft, means for supplying regeneration gas to said shaft, means for withdrawing spent regeneration gas from said shaft, and a series of horizontal partitioning plates in the lower portion of said shaft, the uppermost partitioning plate having a plurality of uniformly distributed apertures therein and successive partitioning plates below said uppermost plate having progressively decreasing numbers of apertures therein, said apertures in any one of said successive partitioning plates being horizontally staggered with respect to apertures in the partitioning plate thereabove, the improvement which comprises a horizontal grid positioned above the uppermost baffle consisting of a plurality of deep and narrow spaced bars extending entirely across the shaft, the distance between the bars being not greater than the diameter of the apertures in the uppermost partitioning plate, and the distance between the grid and said uppermost partitioning plate being not less than three times the distance between the bars and not less than twice the diameter of the apertures in said uppermost partitioning plate.

LEROY F. STRADER.

REFERENCES CITED

The following references are of record in the file of this patent:

UNITED STATES PATENTS

| Number | Name | Date |
| --- | --- | --- |
| 2,412,136 | Evans et al. | Dec. 3, 1946 |